United States Patent
Boutaghou et al.

(10) Patent No.: US 7,209,323 B2
(45) Date of Patent: Apr. 24, 2007

(54) SLIDER HAVING CAVITY FLOOR WITH DIFFERING DEPTHS

(75) Inventors: Zine-Eddine Boutaghou, St. Paul, MN (US); Weimin Qian, Bloomington, MN (US); Moshe Olim, Eden Prairie, MN (US); Anthony Sannino, Longmont, CO (US); Jianxun Zhu, Eagan, MN (US); Catalin Serpe, Minnetonka, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 11/112,157

(22) Filed: Apr. 22, 2005

(65) Prior Publication Data

US 2005/0190501 A1 Sep. 1, 2005

Related U.S. Application Data

(63) Continuation of application No. 09/916,801, filed on Jul. 27, 2001, now Pat. No. 6,934,122.

(60) Provisional application No. 60/232,474, filed on Sep. 13, 2000, provisional application No. 60/223,907, filed on Aug. 9, 2000, provisional application No. 60/221,531, filed on Jul. 28, 2000.

(51) Int. Cl.
*G11B 5/60* (2006.01)
*G11B 17/32* (2006.01)
*G11B 21/21* (2006.01)

(52) U.S. Cl. .................. 360/235.5; 360/236.3

(58) Field of Classification Search ...... 360/234–237.1
See application file for complete search history.

(56) References Cited

U.S. PATENT DOCUMENTS 4,081,846 A 3/1978 Roscamp et al. ........ 360/236.5

(Continued)

FOREIGN PATENT DOCUMENTS

EP 0 747 890 A1 12/1996

(Continued)

OTHER PUBLICATIONS

Photograph of TDK TPC ABS slider from Quantum Fireball 2 Drive, publicly on sale at least as early as Jan. 1, 1996.

(Continued)

*Primary Examiner*—Craig A. Renner
(74) *Attorney, Agent, or Firm*—Westman, Champlin & Kelly

(57) ABSTRACT

A disc head slider having a slider body that includes a bearing surface, a cavity dam and a sub-ambient pressure cavity is provided. The sub-ambient pressure cavity has a cavity floor, a plurality of sides and a depth that progressively varies between a point on one of the sides and a corresponding point on an opposing side. The depth is measured from the bearing surface to the cavity floor. The cavity floor comprises a plurality of substantially flat bottom surfaces that are separated by at least one elevational change. Other embodiments pertain to other specialized slider cavity configurations.

17 Claims, 11 Drawing Sheets

U.S. PATENT DOCUMENTS

| | | | |
|---|---|---|---|
| 4,218,715 A | 8/1980 | Garnier | 360/236.2 |
| 4,646,180 A | 2/1987 | Ohtsubo | 360/236.6 |
| 4,670,806 A | 6/1987 | Ghose | 360/235.7 |
| 4,870,519 A | 9/1989 | White | 360/236.7 |
| 4,910,621 A | 3/1990 | Matsuda et al. | 360/235.1 |
| 5,097,369 A | 3/1992 | Matsuzaki | 360/236 |
| 5,128,822 A | 7/1992 | Chapin et al. | 360/236.3 |
| 5,156,704 A | 10/1992 | Kemp | 216/52 |
| 5,212,608 A | 5/1993 | Yoneoka | 360/236.8 |
| 5,220,471 A | 6/1993 | Matsuzaki | 360/234.5 |
| 5,237,476 A | 8/1993 | Bischoff et al. | 360/126 |
| 5,256,850 A | 10/1993 | Maegawa et al. | 219/121.69 |
| 5,266,769 A | 11/1993 | Deshpande et al. | 219/121.69 |
| 5,303,105 A | 4/1994 | Jorgenson | 360/294.3 |
| 5,327,311 A | 7/1994 | Ananth et al. | 360/235.6 |
| 5,343,343 A | 8/1994 | Chapin | 360/236.1 |
| 5,404,256 A | 4/1995 | White | 360/236.3 |
| 5,442,850 A | 8/1995 | Kerth | 29/603.12 |
| 5,515,219 A | 5/1996 | Ihrke et al. | 360/236.1 |
| 5,624,581 A | 4/1997 | Ihrke et al. | 216/22 |
| 5,777,825 A | 7/1998 | Dorius | 360/235.6 |
| 5,872,686 A | 2/1999 | Dorius et al. | 360/236.3 |
| 5,917,678 A | 6/1999 | Ito et al. | 360/235.4 |
| 6,021,020 A | 2/2000 | Itoh et al. | 360/236.1 |
| 6,055,127 A | 4/2000 | Boutaghou et al. | 360/732 |
| 6,073,337 A | 6/2000 | Strom | 29/603.12 |
| 6,229,672 B1 | 5/2001 | Lee et al. | 360/236.8 |
| 6,311,388 B1 * | 11/2001 | Berg et al. | 360/235.4 |
| 6,483,667 B1 | 11/2002 | Berg et al. | 360/235.6 |
| 6,606,222 B1 | 8/2003 | Ryun | 360/236.5 |
| 6,765,758 B1 | 7/2004 | Cha | 360/236.1 |
| 2002/0135941 A1 | 9/2002 | Kohira et al. | 360/235.5 |

FOREIGN PATENT DOCUMENTS

| | | |
|---|---|---|
| JP | 58-88872 | 5/1983 |
| JP | 61-160885 | 7/1986 |
| JP | 61-204877 | 9/1986 |
| JP | 04-032081 | 2/1992 |
| JP | 08-124140 | 5/1996 |
| JP | 11-120728 | 4/1999 |
| WO | WO 9741555 A1 * | 11/1997 |
| WO | WO 9821716 A1 * | 5/1998 |
| WO | WO 00/28528 | 5/2000 |
| WO | WO 01/41141 A2 | 6/2001 |

OTHER PUBLICATIONS

Photograph of TDK AAB slider from Pike Disc Drive, publicly on sale at least as early as Jan. 31, 1996.

* cited by examiner

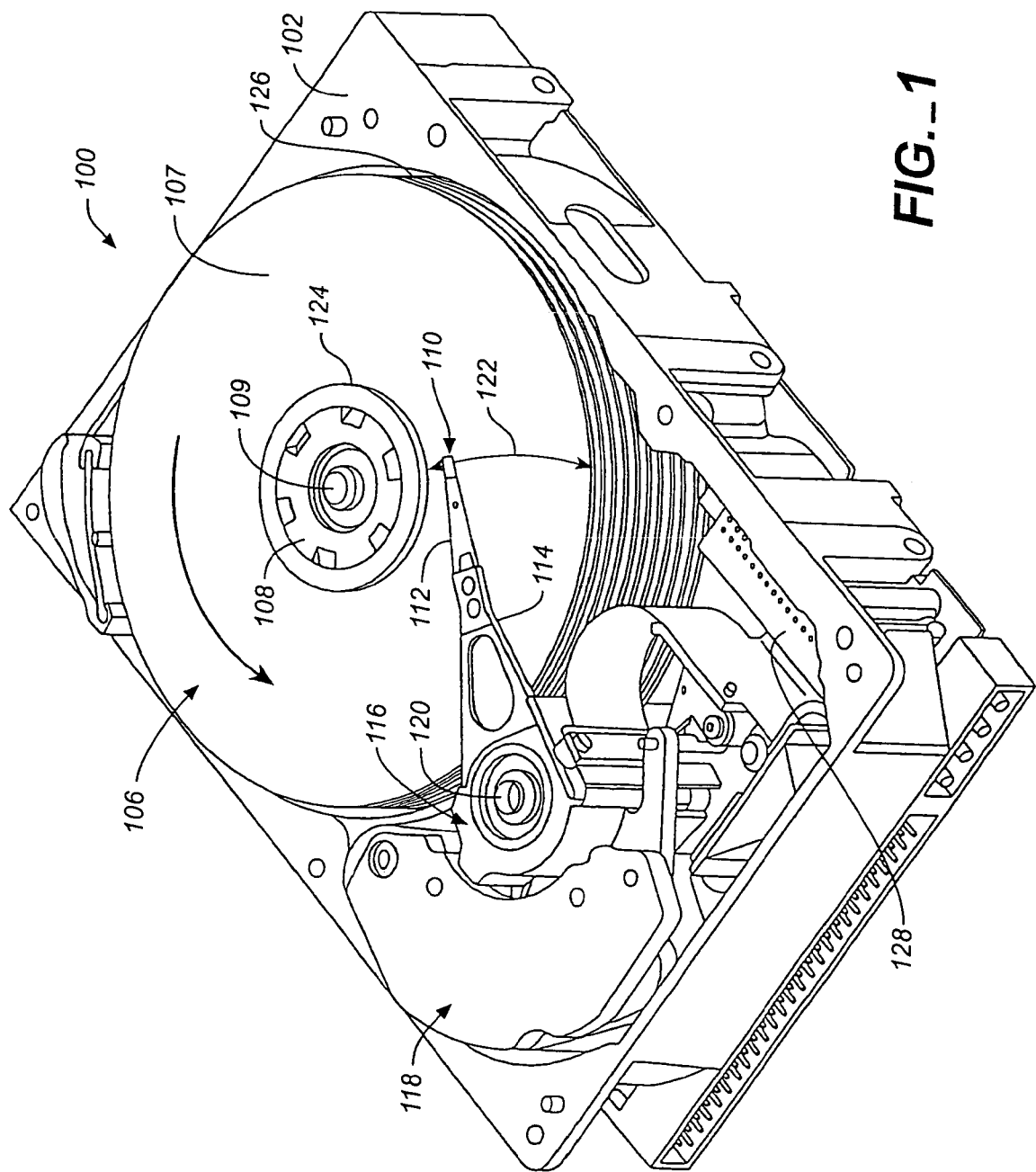
FIG._1

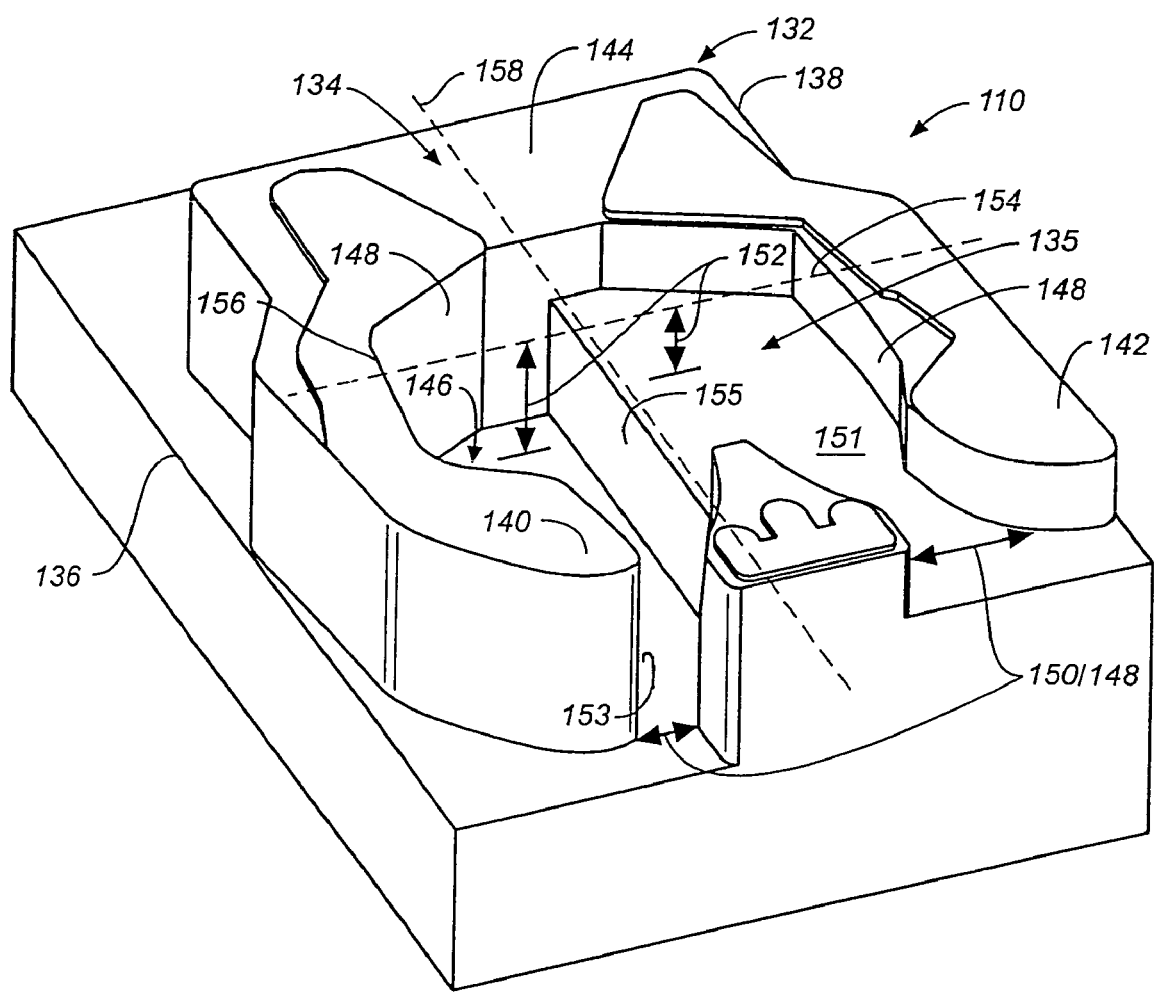
FIG._2

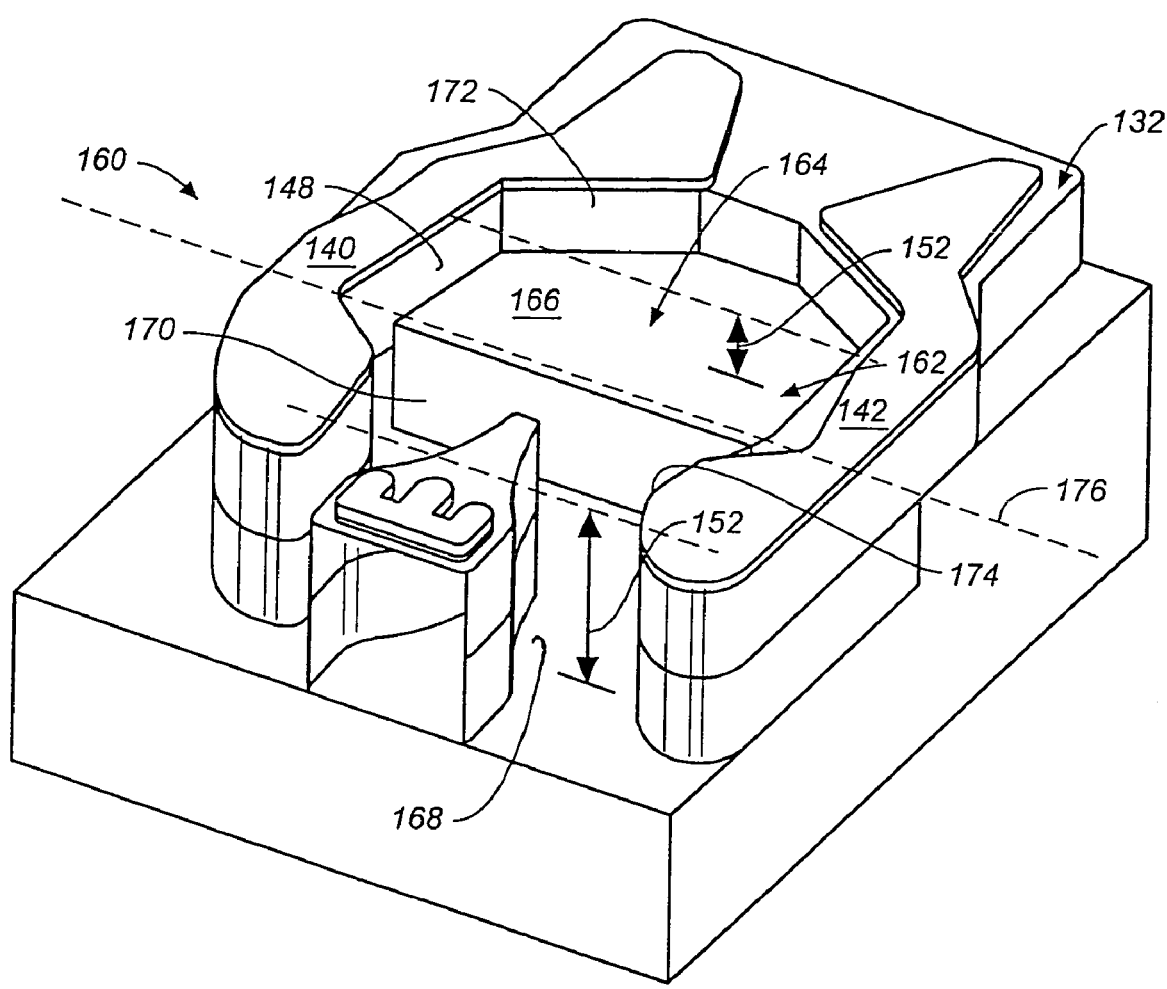
FIG._3

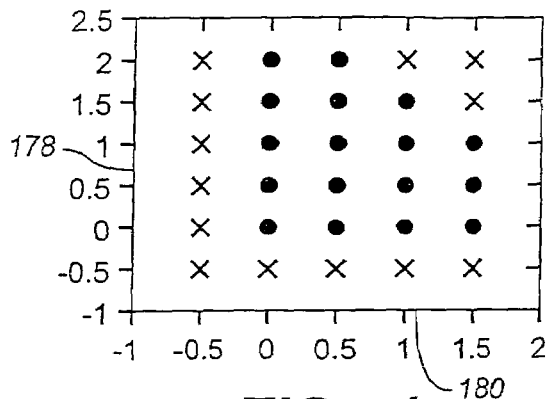
FIG._4
PRIOR ART
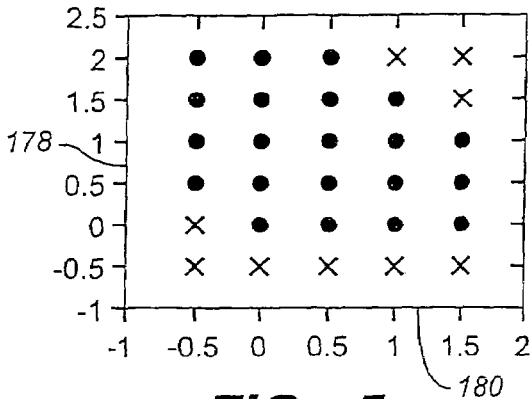
FIG._5
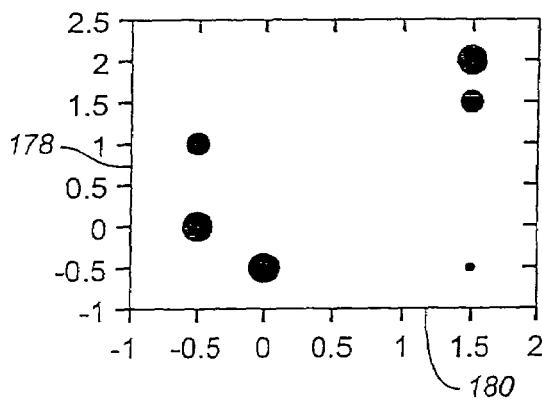
FIG._6
PRIOR ART
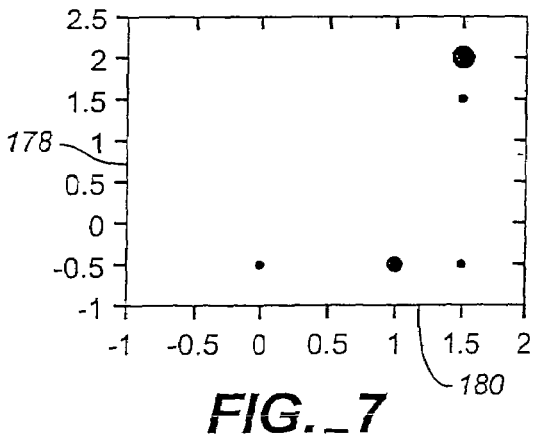
FIG._7
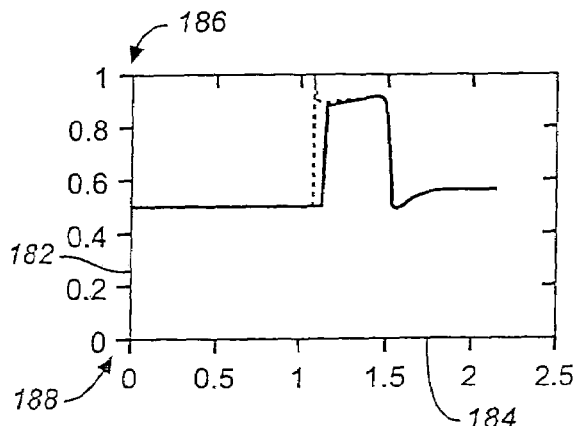
FIG._8
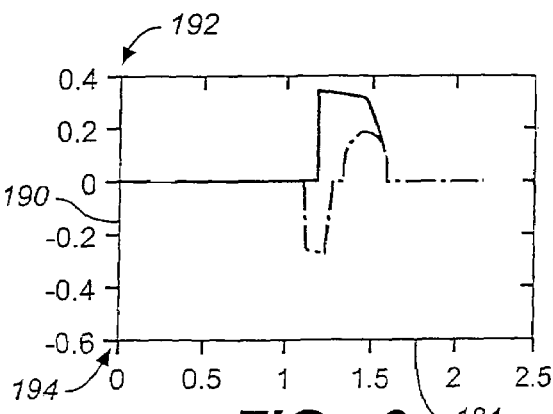
FIG._9

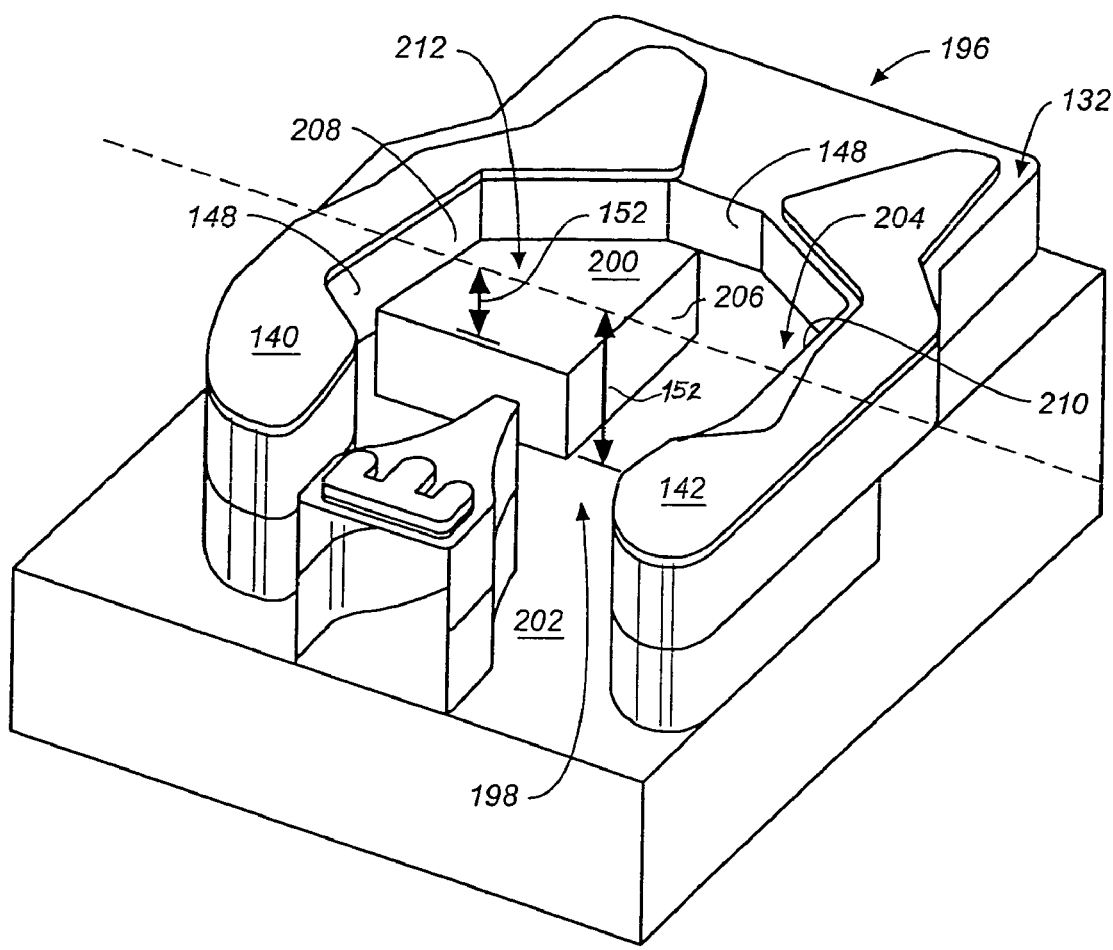
FIG._10

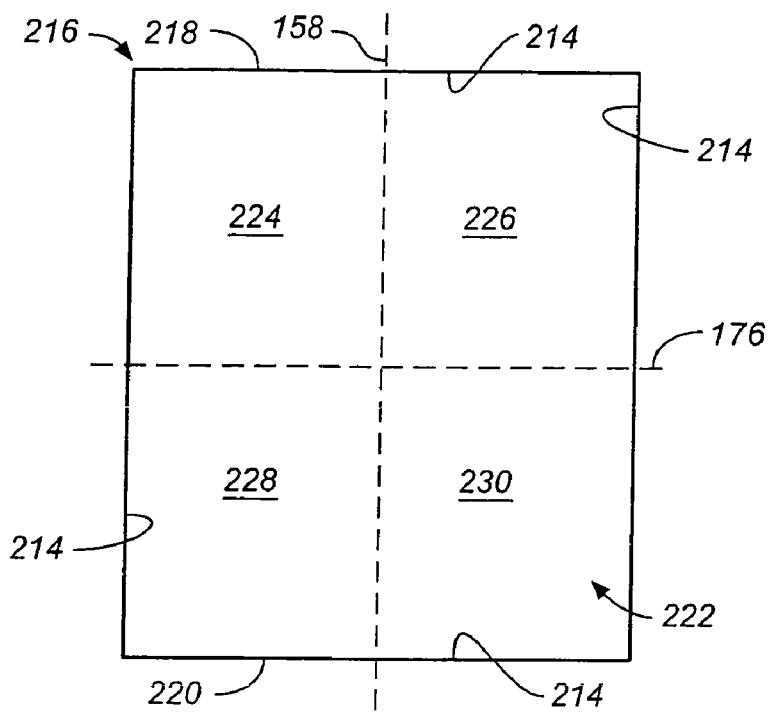
FIG._11
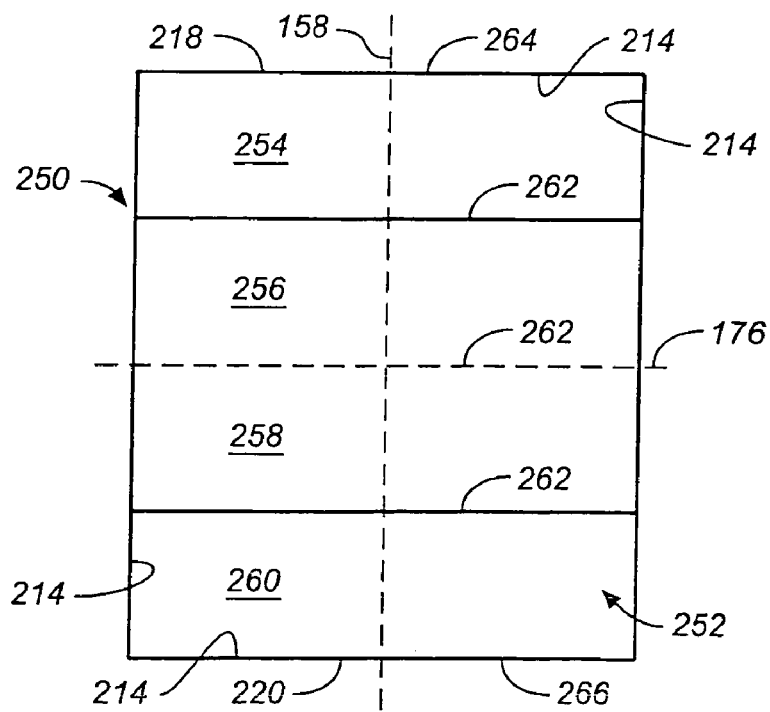
FIG._13

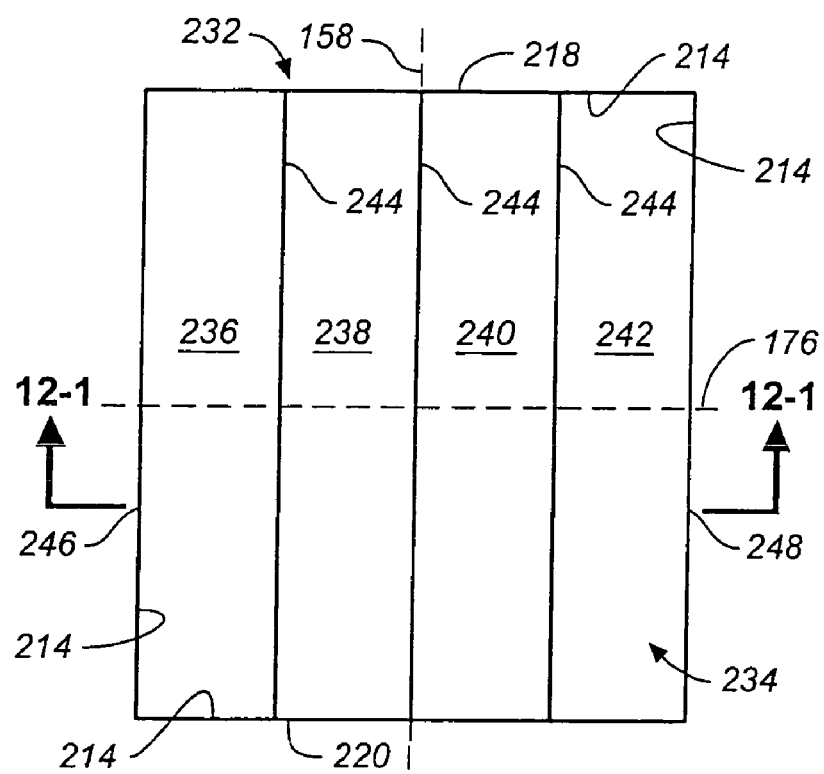
FIG._12
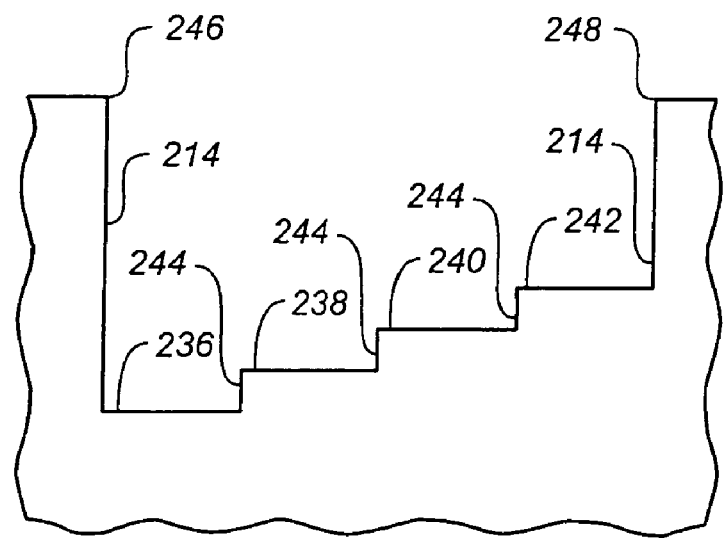
FIG._12-1

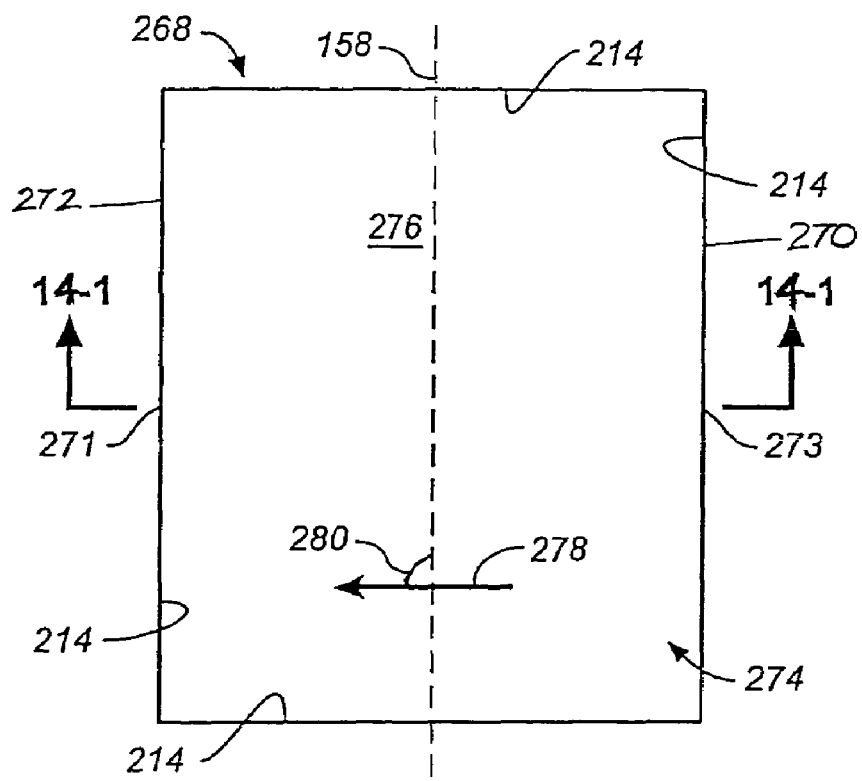
FIG._14
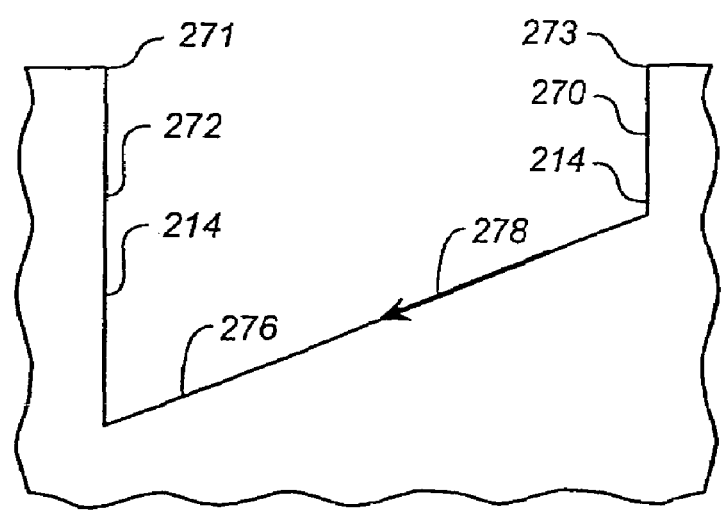
FIG._14-1

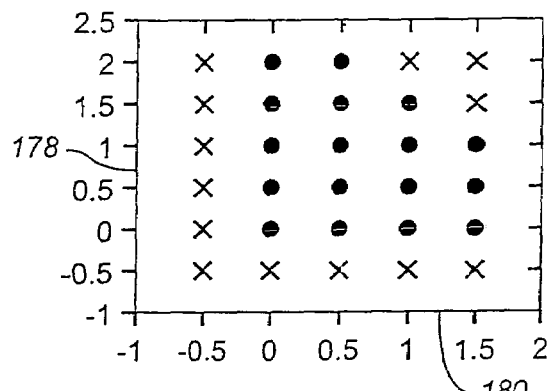
FIG._15
PRIOR ART
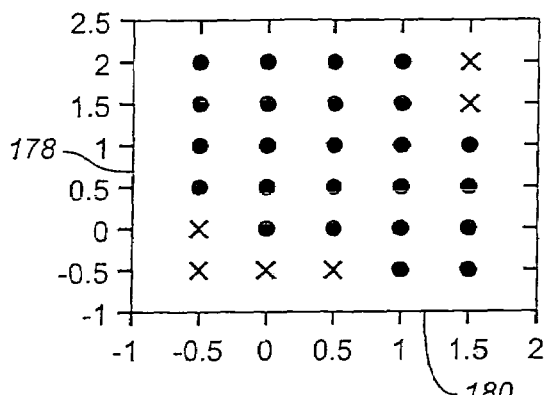
FIG._16
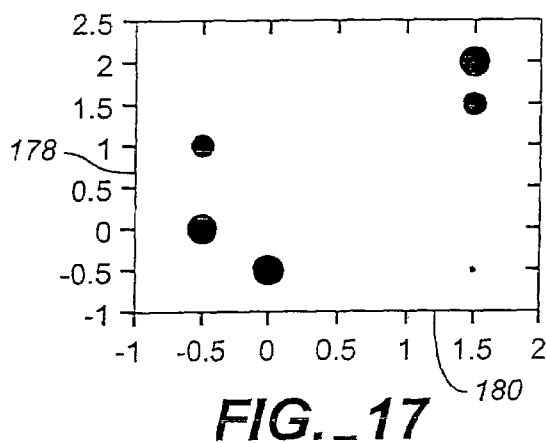
FIG._17
PRIOR ART
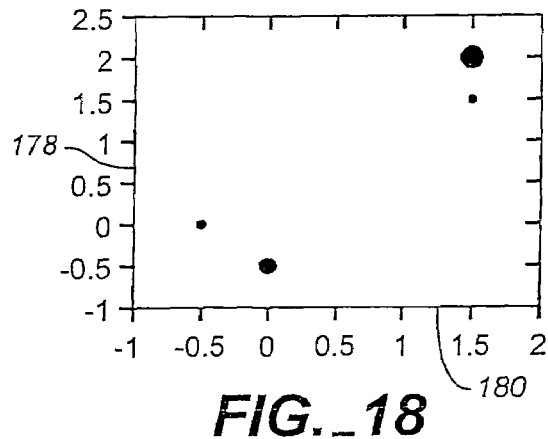
FIG._18

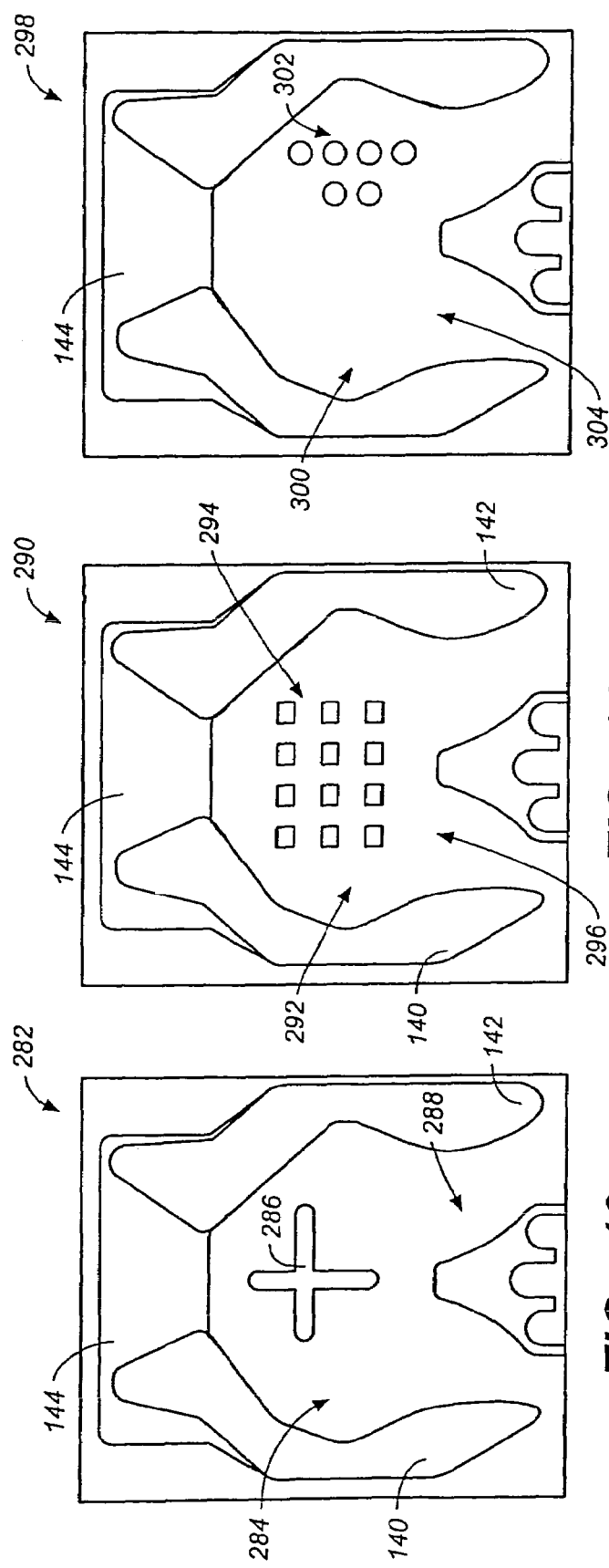

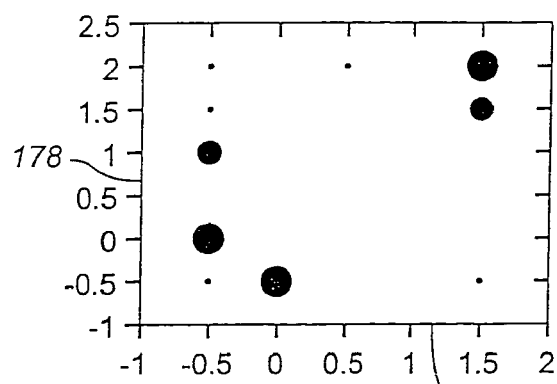
FIG._22
PRIOR ART
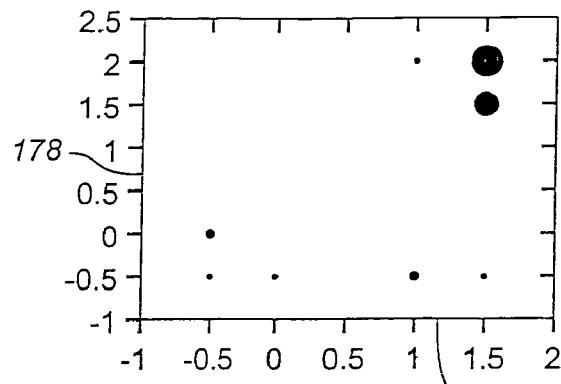
FIG._23
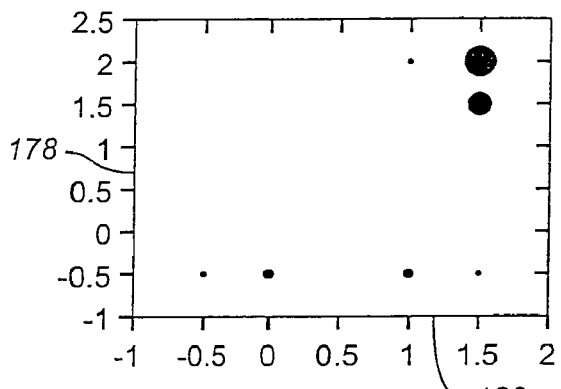
FIG._24
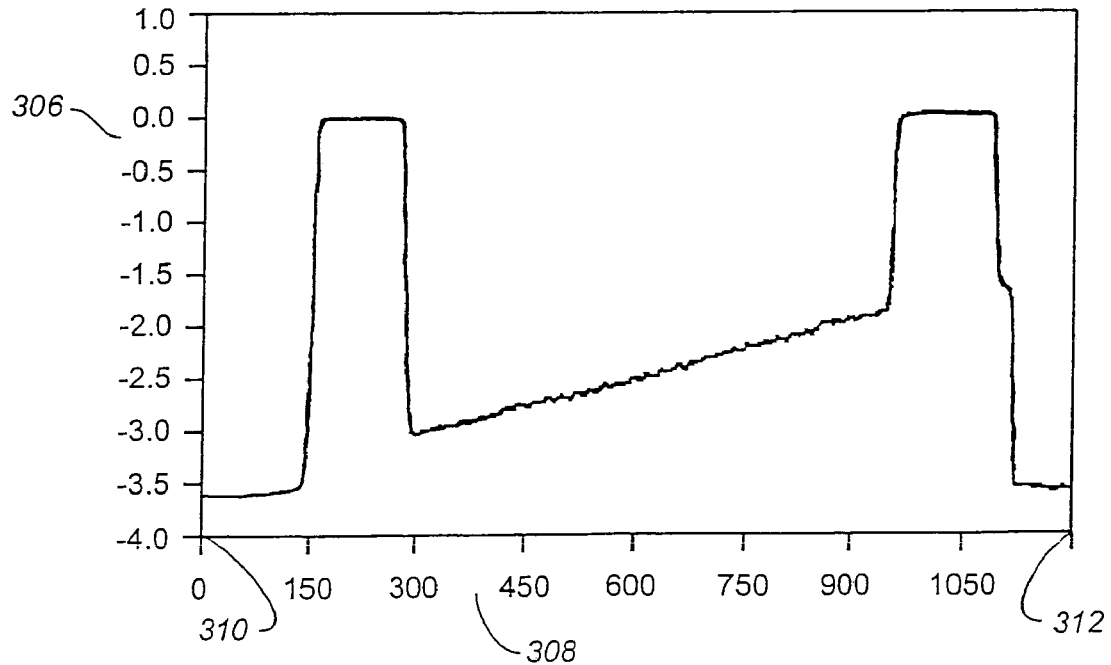
FIG._25

SLIDER HAVING CAVITY FLOOR WITH DIFFERING DEPTHS

CROSS-REFERENCE TO RELATED APPLICATION

This application is a continuation of and claims priority from earlier filed U.S. application Ser. No. 09/916,801, filed Jul. 27, 2001, now U.S. Pat. No. 6,934,122, issued Aug. 23, 2005, and entitled "DISC HEAD SLIDER WITH SUB-AMBIENT PRESSURE CAVITY BOTTOM SURFACES OF DIFFERING DEPTHS," which in turn is based on and claims the benefit of U.S. provisional applications Ser. Nos. 60/221,531, filed Jul. 28, 2000; 60/223,907, filed Aug. 9, 2000; and 60/232,474, filed Sep. 13, 2000, the contents of all of which are incorporated by reference herein.

FIELD OF THE INVENTION

The present invention relates to disc drive systems. More specifically, the present invention relates to disc head sliders within disc drive systems.

BACKGROUND OF THE INVENTION

In data processing systems, disc drives are often used as storage devices. Such drives use rigid discs, which are coated with a magnetizable medium for storage of digital information in a plurality of circular, concentric data tracks. The discs are mounted on a spindle motor, which causes the discs to spin and the surfaces of the discs to pass under respective hydrodynamic (e.g. air) bearing disc head sliders. The sliders carry transducers, which write information to and read information from the disc surfaces.

An actuator mechanism moves the sliders from track-to-track across the surfaces of the discs under control of electronic circuitry. The actuator mechanism includes a track accessing arm and a suspension for each head gimbal assembly. The suspension includes a load beam and a gimbal. The load beam provides a load force which forces the slider toward the disc surface. The gimbal is positioned between the slider and the load beam, or is integrated in the load beam, to provide a resilient connection that allows the slider to pitch and roll while following the topography of the disc.

The slider includes a bearing surface, which faces the disc surface. As the disc rotates, the disc drags air under the slider and along the bearing surface in a direction approximately parallel to the tangential velocity of the disc. As the air passes beneath the bearing surface, air compression along the air flow path causes the air pressure between the disc and the bearing surface to increase, which creates a hydrodynamic lifting force that counteracts the load force and causes the slider to lift and fly above or in close proximity to the disc surface.

One type of slider is a "self-loading" air bearing slider, which includes a leading taper (or stepped-taper), a pair of raised side rails, a cavity dam and a subambient pressure cavity. The leading taper is typically lapped or etched onto the end of the slider that is opposite to the recording head. The leading taper pressurizes the air as the air is dragged under the slider by the disc surface. An additional effect of the leading taper is that the pressure distribution under the slider has a first peak near the taper end or "leading edge" due to a high compression angle of the taper or step, and a second peak near the recording end or "trailing edge" due to a low bearing clearance for efficient magnetic recording. This dual-peak pressure distribution results in a bearing with a relatively high pitch stiffness.

The bearing clearance between the slider and the disc surface at the recording head is an important parameter to disc drive performance. As average flying heights continue to be reduced, these decreases in fly height can cause the contact frequency between disc and head to increase. For example, while demand for increasing disc drive recording density has resulted in drastic decreases in head-media spacing (HMS), manufacturing variation-induced HMS loss has been observed to be an increasing source of head/media intermittent contact, especially at sub half-micro inch fly heights. Such intermittent contact can damage the head and/or the disc surface, and can induce vibrations detrimental to the quality of head reading/writing at such low fly heights.

The sliders to which read/write heads are attached typically possess three degrees of freedom (vertical motion, pitch rotation and roll rotation) associated with three applied forces, i.e., pre-load forces and air bearing suction and lift forces. Steady state fly attitude of the entire slider is achieved when these three forces balance each other. Desirably, the fluid bearing underneath the slider maintains a steady state position relative to the media and possesses intrinsic stiffness with respect to its three degrees of freedom, i.e., vertical stiffness, pitch stiffness and roll stiffness. Of large interest for HMS variation, contact stiffness is defined as a vectorial combination of slider pitch stiffness and slider vertical stiffness. Contact stiffness characterizes the vertical stiffness of the slider at the particular location of the pole tip. Contact stiffness is defined as:

$$Kc = \frac{Kp}{\frac{Kp}{Kz} + b^2}$$

where Kp, Kz and b are respectively the slider pitch stiffness, slider vertical stiffness and distance between slider pivot point and pole tip.

It has been shown that manufacturing variations, such as variation in pitch static attitude or in pre-load forces, impose undesirable variations on the slider in terms of flight attitude. Increasing pitch stiffness and vertical stiffness of the air bearing results in a larger resistance to these undesirable variations. Increasing stiffness is achieved by generating more suction and lift force per unit area. In other words, low manufacturing sensitivity can be achieved by increasing contact stiffness via increases in suction and lift forces.

However, increased suction forces can cause the contact frequency between disc and head to increase during the performance of known loading and unloading processes. Load/unload technology is a known alternative to contact start/stop technology. In accordance with load/unload technology, a ramp is positioned near the outer disc diameter for engaging the suspension to load and unload the slider to and from the disc surface. During the unload process, when disc rotation is powering down or gradually decreasing to a stop, the slider is rotated toward the outer disc diameter until the suspension engages the ramp, which lifts the suspension and the slider away from the disc surface. The slider is then "parked" on the ramp. In order to lift the slider to the ramp, the slider and associated suspension must overcome the suction force, which tends to pull the slider closer to the disc. Depending on the strength of the suction force, it is possible that the slider, on occasion, might slap against the disc surface and cause undesirable head/media contact during the unload process. Generally, as the suction force increases, the likelihood of this type of undesirable contact also increases.

During the load process, when disc rotation is powering up or gradually accelerating to an operational speed, the slider is moved off the ramp and onto the disc. As the slider approaches the disc, a positive air bearing pressure is developed to cushion the slider. However, if this lifting force is developed slower than the suction force (in a negative pressure air bearing design), the slider will contact the disc, which can lead to severe disc/media damage. Also, due to the inconsistencies associated with manufacturing tolerances, sliders with non-nominal pitch static attitude (PSA) and/or roll static attitude (RSA) exist. These unfavorable conditions increase the chances of slider contact with the disc during load/unload processes.

Suction force therefore plays an important role in load/unload contact. While the likelihood of slider contact could be decreased or eliminated by decreasing the suction force, this suction force is needed to maintain high stiffness and low fly sensitivity.

Sliders that provide a solution to this and other problems, and offer advantages over the prior art are therefore desired.

SUMMARY OF THE INVENTION

The present invention relates to data storage devices that include disc head sliders having sub-ambient pressure cavity configurations that address the above-mentioned problems.

One embodiment of the present invention pertains to a disc head slider having a slider body that includes a bearing surface, a cavity dam and a sub-ambient pressure cavity. The sub-ambient pressure cavity has a cavity floor, a plurality of sides and a depth that progressively varies between a point on one of the sides and a corresponding point on an opposing side. The cavity floor comprises a plurality of substantially flat bottom surfaces that are separated by at least one elevational change.

Another embodiment of the present invention pertains to a disc head slider having a slider body that includes a bearing surface, a cavity dam and a sub-ambient pressure cavity. The sub-ambient pressure cavity has a cavity floor that includes at least three different depths. The cavity floor comprises a plurality of substantially flat bottom surfaces that are separated by at least one elevational change.

Another embodiment of the present invention pertains to a disc head slider having a slider body that includes a bearing surface, a cavity dam and a sub-ambient pressure cavity. The sub-ambient pressure cavity has a cavity floor, a longitudinal axis and a plurality of sides. The sub-ambient pressure cavity also has a depth that progressively varies between a first point on one of the sides and a corresponding second point on an opposing side. The cavity floor has a tapered bottom surface and a line of maximum slope that is offset at an angle from the longitudinal axis.

Another embodiment of the present invention pertains to a disc head slider that includes a slider body having a bearing-surface, a cavity dam and a sub-ambient pressure cavity. The sub-ambient pressure cavity has a plurality of sides, a cavity floor and a first depth. A protruding pattern is disposed on the cavity floor and is disassociated from the plurality of sides. The protruding pattern has a second depth that is less than the first depth.

Another embodiment of the present invention pertains to a disc head slider having a slider body that includes a bearing-surface, a cavity dam and a sub-ambient pressure cavity. The sub-ambient pressure cavity has a plurality of sides, a cavity floor and a first depth. A recessed pattern is disposed on the cavity floor and is disassociated from the plurality of sides. The recessed pattern has a bottom surface and a second depth. The second depth is greater than the first depth and sufficient to affect a pressure characteristic associated with the sub-ambient pressure cavity during operational motion of the disc head slider.

These and various other features, as well as advantages that characterize the present invention, will be apparent upon a reading of the following detailed description and review of the associated drawings.

BRIEF DESCRIPTION OF THE DRAWINGS

FIG. 1 is a top perspective view of a disc drive in which the present invention is useful.

FIG. 2 is a bottom perspective view of a disc head slider.

FIG. 3 is a bottom perspective view of a disc head slider.

FIGS. 4 through 9 are graphs that illustrate a performance comparison between a slider having a single-depth cavity and a slider having a specialized cavity configuration.

FIG. 10 is a bottom perspective view of a disc head slider.

FIG. 11 is a schematic plan view of a specialized slider cavity configuration.

FIG. 12 is a schematic plan view of a specialized slider cavity configuration.

FIG. 12-1 is a sectional side view taken along line 12-1 of an embodiment of the slider cavity illustrated in FIG. 12.

FIG. 13 is a schematic plan view of a specialized slider cavity configuration.

FIG. 14 is a schematic plan view of a specialized slider cavity configuration.

FIG. 14-1 is a sectional view taken along line 14-1 of an embodiment of the slider cavity illustrated in FIG. 14.

FIGS. 15 through 18 are graphs that illustrate a performance comparison between a slider having a single-depth cavity and a slider having a specialized cavity configuration.

FIG. 19 is a schematic plan view of a specialized cavity configuration.

FIG. 20 is a schematic plan view of a specialized cavity configuration.

FIG. 21 is a schematic plan view of a specialized cavity configuration.

FIGS. 22–24 are graphs that illustrate a performance comparison between a slider having a single-depth cavity and a slider having a specialized cavity configuration.

FIG. 25 is a graph that depicting a collection of illustrative depth measurements for a slider having a cavity that includes a configuration similar to FIGS. 14 and 14-1.

DETAILED DESCRIPTION OF ILLUSTRATIVE EMBODIMENTS

FIG. 1 is a perspective view of a disc drive 100 in which the present invention is useful. Disc drive 100 includes a housing with a base 102 and a top cover (not shown). Disc drive 100 further includes a disc pack 106, which is mounted on a spindle motor (not shown) by a disc clamp 108. Disc pack 106 includes a plurality of individual discs 107, which are mounted for co-rotation about central axis 109. Each disc surface has an associated slider 110 which is mounted to disc drive 100 and carries a read/write head for communication with the disc surface. The read/write head can include any type of transducing head, such as an inductive head, a magneto-resistive head, an optical head or a magneto-optical head for example.

In the example shown in FIG. 1, sliders 110 are supported by suspensions 112 which are in turn attached to track accessing arms 114 of an actuator 116. The actuator shown in FIG. 1 is of the type known as a rotary moving coil actuator and includes a voice coil motor (VCM), shown generally at 118. Voice coil motor 118 rotates actuator 116 with its attached sliders 110 about a pivot shaft 120 to position sliders 110 over a desired data track along a path 122 between a disc inner diameter 124 and a disc outer diameter 126. Voice coil motor 118 operates under control of internal circuitry 128. Other types of actuators can also be used, such as linear actuators.

During operation, as discs 107 rotate, the discs drag air under the respective sliders 110 and along their air bearing surfaces in a direction approximately parallel to the tangential velocity of the discs. As the air passes beneath the air bearing surfaces, air compression along the air flow path causes the air pressure between the discs and the air bearing surfaces to increase, which creates a hydrodynamic lifting force that counteracts the load force provided by suspensions 112 and causes the sliders 110 to lift and fly above or in close proximity to the disc surfaces.

In accordance with an embodiment of the present invention, sliders 110 include specialized features formed in a cavity portion of slider surfaces that face discs 107. Illustratively, some of these specialized features enable reductions in contact occurrences between each slider 110 and an associated disc 107 during load/unload operations known in the art, while at the same time maintaining the benefits of suction force in sustaining a steady state fly attitude for each slider 110 during operational rotation of discs 107. In addition, some of the specialized features enhance the flight performance of sliders 110 by enabling improved insensitivity to manufacturing variations; increased control of suction force magnitude and suction center movement; and increased contact stiffness, pitch stiffness and/or vertical stiffness.

FIG. 2, in accordance with an embodiment of the present invention, is a perspective view of slider 110, as viewed from the surface of a disc, i.e., disc 107 (FIG. 1). The vertical dimensions are exaggerated in FIG. 2 for clarity. Slider 110 is formed of a substrate having a slider body 132 that includes a surface 134. Surface 134 includes an inside edge 136 and an outside edge 138. An inside rail 140 is disposed on and extends from surface 134 proximate inside edge 136. An outside rail 142 is disposed on and extends from surface 134 proximate outside edge 138. Inside rail 140 and outside rail 142 form respective bearing surfaces, illustratively airbearing surfaces. A cavity dam 144 is disposed between inside rail 140 and outside rail 142. In one embodiment, cavity dam 144 is recessed from the bearing surfaces formed by rails 140 and 142 by a step depth of 0.1 microns to 0.3 microns, for example.

A sub-ambient pressure cavity 146 is positioned between inside rail 140, outside rail 142 and cavity dam 144. Sub-ambient pressure cavity 146 has a plurality of sides 148 (an illustrative few have been labeled in FIG. 2) that bound the cavity along its perimeter. With regard to the FIG. 2 embodiment and to other slider embodiments described below in relation to other Figures, it should be noted that at least one side 148 may be formed by an opening. For instance, in FIG. 2, openings 150 should also be considered sides 148 of cavity 146. In addition, while cavity 146 in FIG. 2 is depicted as having an octagon-like shape, other cavity 146 shapes (i.e., square, rectangular, triangular, etc.) having a variety of side 148 configurations should be considered within the scope of the present invention. This also holds true for other slider embodiments described below.

Cavity 146 has a cavity floor 135, which is recessed from the bearing surfaces (formed by rails 140 and 142) by a cavity depth 152 that is greater than the step depth. Cavity floor 135 has surfaces 151 and 153 which are separated from one another by an elevational step or change 155. Illustratively, surfaces 151 and 153 are substantially flat or planar. Step 155 can be a substantially vertical step as shown in FIG. 2, or can be contoured in other embodiments. In the embodiment shown in FIG. 2, cavity floor 135 has only one step 155. However, cavity floor 135 can have any number of steps 155 that progressively vary the cavity depth. Depth 152 progressively varies (e.g., progressively decreases) between a point 154 on one of sides 148 and a corresponding point 156 on an opposing (i.e., directly across cavity 146) side 148. Cavity 146 also includes a longitudinal axis 158. Bottom surface 151 is positioned substantially on one side of axis 158 and bottom surface 153 is positioned substantially on the other side of the longitudinal axis. It should be noted that disc head slider 110 (as well as the other slider embodiments described below) will also typically include a read/write transducer (not shown) positioned in one of a variety of potential locations on slider body 132. The precise location of the transducer is not critical to the present invention.

It should be noted that while FIG. 2 depicts bottom surface 151 as having a depth that is more shallow than the depth of bottom surface 153, this relationship could just as easily be switched such that the depth of surface 151 is deeper than the depth of surface 153. Illustratively, either way, depth 152 will still progressively vary between point 154 and point 156 (and other pairs of corresponding points along sides 148).

Also, in other embodiments of the present invention, cavity floor 135 can have additional flat cavity surfaces, in addition to surfaces 151 and 153, wherein all of the flat surfaces are separated by at least one elevational step or change. In one embodiment (not shown), there are multiple and an equal number of bottom surfaces on either side of longitudinal axis 158. In another embodiment, regardless of the quantity or positioning of cavity surfaces, depth 152 progressively varies between a first point on a side 148 and a corresponding second point on an opposing side 148, the first and second points not necessarily being positioned in locations identical to the illustrated points 154/156. In yet another embodiment, at least three bottom surfaces are positioned so as to have at least three different depth 152 measurements (i.e., at least three bottom surfaces each having a unique depth 152). In accordance with one embodiment, multiple cavity bottom surfaces are positioned so as to have at least three different depth 152 measurements, wherein the overall depth 152 does not, in any instance, progressively vary between any point on a side 148 and any corresponding second point on an opposing (i.e., directly across cavity 146) side 148. For example, the cavity surfaces might be arranged such that the only variation of depth 152, between a point on a side 148 and a corresponding second point on an opposing side, is variation from a first depth, to a second depth, and back to the first depth. Finally, while elevational step 155 is depicted in FIG. 2 as being substantially parallel to longitudinal axis 158, incorporated elevational steps could just as easily be positioned offset from or at an angle to the longitudinal axis.

FIG. 3 is a perspective view of a disc head slider 160, as viewed from the disc surface, in accordance with another embodiment of the present invention. The vertical dimensions are exaggerated in FIG. 3 for clarity. The same reference numbers are used in FIG. 3 for elements that are the same or similar to those elements illustrated and labeled in FIG. 2. Slider 160 includes a sub-ambient pressure cavity 162 having a cavity floor 164. Cavity floor 164 includes a bottom surface 166 and a bottom surface 168 that are separated from one another by an elevational step 170. Cavity 162 also includes a plurality of sides 148 (a representative few have been labeled) that bound the cavity along its perimeter. A depth 152 progressively varies (i.e., progressively decreases) between a point 172 on one of sides 148 and a corresponding point 174 on an opposing (i.e., directly across cavity 162) side 148. Depth 152 is measured from one of the bearing surfaces (i.e., rail 140 or rail 142) to a plane level with a bottom surface (i.e., surface 166 or 168). Sub-ambient pressure cavity 162 includes a transversal axis 176.

Slider 160 includes a positioning of bottom surface 166 that is substantially on one side of transversal axis 176, and a positioning of bottom surface 168 that is substantially on the other side of the transversal axis. It should be noted that while FIG. 3 depicts bottom surface 166 as having a depth that is more shallow than the depth of bottom surface 168, this relationship could just as easily be switched such that the depth of surface 166 is deeper than the depth of surface 168. Either way, depth 152 will still, illustratively, progressively vary between point 172 and point 174 (and other pairs of corresponding points along sides 148).

Still referring to FIG. 3, in accordance with one embodiment, other substantially flat bottom surfaces, in addition to surfaces 166 and 168, are disposed within cavity 162 such that all bottom surfaces are separated by at least one elevational step or change. In one embodiment, there are an equal number of bottom surfaces on either side of transversal axis 176. In another embodiment, regardless of the quantity or positioning of bottom surfaces, depth 152 progressively varies between a first point on a side 148 and a corresponding second point on an opposing side 148, the first and second points not necessarily being positioned in locations identical to the illustrated points 172/174. In yet another embodiment, at least three bottom surfaces are positioned so as to have at least three different depth 152 measurements (i.e., at least three bottom surfaces each having a unique depth 152). Also, while elevational step 170 is depicted in FIG. 3 as being substantially parallel to transversal axis 176, incorporated elevational steps could just as easily be positioned offset at an angle to the transversal axis. Such steps could also be contoured, rather than the illustrated flat configuration.

Other embodiments of the present invention include those with more than one separate cavity, each individual cavity having a different depth and/or shape. Illustratively, each individual cavity could include multiple depths and could include multiple substantially flat-topped bottom surfaces. The multiple bottom surfaces within each individual cavity could be separated by at least one elevational step and could have any of the configurations described above in relation to previously described cavity embodiments.

In accordance with an embodiment of the present invention, the quantity, depth, shape and positioning of bottom surfaces within a sub-ambient pressure cavity can be selected based on a particular slider or slider application to produce various desired performance-related outcomes. Illustratively, different desired outcomes might include different slider/disc contact results, improved insensitivity to slider manufacture variations, and/or different control features for suction force magnitude and suction center movement. In accordance with one embodiment, cavity features are selected to enable reductions in slider/disc contact during load/unload processes, while at the same time maintaining the benefits of suction force in sustaining a steady state slider fly attitude during standard operational rotation of an associated disc.

FIG. 4 is a graph illustrating a contact window for a regular air-bearing slider (i.e., single depth cavity). The graph plots pitch static angle (PSA) 178 (in degrees) versus roll static angle (RSA) 180 (also in degrees). Within the graph, the dots represent no load contact for the specific PSA/RSA conditions. The "x" marks represent contact with the disc surface. FIG. 5 is a graph illustrating a contact window for slider 110 (FIG. 2), which has a two-depth cavity. The FIG. 5 graph plots the same units against each other and in a similar manner as the graph in FIG. 4. These two graphs (FIGS. 4 and 5) show that the two-depth cavity design demonstrates an improved no contact window, especially in negative RSA regions.

FIG. 6 is a graph illustrating "contact energy" for a regular air-bearing slider that is similar to slider 110 in FIG. 2 but includes a single depth cavity. The graph plots the same units against each other as the previously described graphs. Contact energy is a measurement of overall contact impact and is defined as contact force multiplied by time. A big dot on the FIG. 6 graph represents severe impact and a small dot represents less severe impact. FIG. 7 is a graph illustrating contact energy for slider 110 (FIG. 2), which includes a two-depth cavity. The FIG. 7 graph plots the same units against each other and in a similar manner as the FIG. 6 graph. These two graphs (FIGS. 6 and 7) show that the two-depth cavity design demonstrates impact reductions, as compared to a regular slider.

In order to explain the two-depth cavity outcomes, a PSA of 1.0 degree and RSA of −0.5 degrees is taken as an example for illustration. Under those conditions, FIG. 8 is a plot of normalized x coordinates 182 (along slider length direction or along longitudinal axis) of suction force center versus time increments 184 (measured in seconds) during a loading portion of a load/unload process. A top portion 186 of the FIG. 8 graph generally corresponds to the end of the slider that includes a cavity dam (leading end). A bottom portion 188 of the FIG. 8 graph generally corresponds to the end of the slider opposite the cavity dam (trailing end). The solid line on the graph represents the regular design and the dotted line represents the two-depth cavity design.

FIG. 9 is a plot of normalized y coordinates 190 (along slider width direction or along transversal axis) of suction force center versus time increments 184 during the load process. A top portion 192 of the FIG. 9 graph generally corresponds to the outside rail (OR) portion of the slider. A bottom portion 194 of the FIG. 9 graph generally corresponds to the inside rail (IR) portion of the slider. Again, the solid line represents the regular design and the dotted line represents the two-depth cavity design.

The FIG. 8 graph shows that the suction center in the length direction for both a single depth cavity design and a two-depth cavity slider design moves similarly with time. However, the FIG. 9 graph shows that suction center in the width direction moves quite differently for the two-depth cavity design. For example, when the slider is loaded with −0.5 degrees of RSA, the outside rail (OR) is closer to the disc during a load approach to the disc. FIG. 9 shows that the single cavity depth slider develops the suction force near the OR. This pulls the slider down towards the disc even further and eventually will result in slider/disc contact. But for the two-depth cavity design, the suction force is first developed near the inside rail (IR). The deeper cavity near the IR (see FIG. 2) creates less air density and provides more suction force during the initial loading process. The torque generated at the IR will balance the downward motion of the IR to some degree. This illustratively reduces the roll angle and helps develop a positive pressure force, and ultimately reduces or prevents slider/disc contact. The multi-depth cavity plays an important role in varying sub-ambient pressure during a loading portion of a load/unload process.

The principles illustrated by FIGS. 4–9 demonstrate but one example of a wide range of potential benefits and outcomes obtainable by the wide range of embodiments of the present invention. It should again be emphasized that the most appropriate and effective embodiment of the present invention is application-dependent and dependent upon a broad range of potential performance characteristics.

FIG. 10, in accordance with another embodiment of the present invention, is a bottom perspective view of a disc head slider 196. The vertical dimensions are exaggerated in FIG. 10 for clarity. The same reference numbers are used in FIG. 10 for elements that are the same or similar to those elements illustrated and labeled in previously described embodiments.

Slider 196 includes a cavity floor 198 having a bottom surface 200 and a bottom surface 202 that are disposed within a sub-ambient pressure cavity 204 and are separated from one another by an elevational step 206. In accordance with one embodiment, surfaces 200 and 202 are substantially flat. Cavity 204 illustratively includes a plurality of sides 148 (a representative few have been labeled) and a depth 152 that progressively varies (e.g., progressively decreases) between a point 208 on one of sides 148 and a corresponding point 210 on an opposing (e.g., directly across cavity 204) side 148. The depth is measured from one of the bearing surfaces (e.g., rail 140 or rail 142) to a plane level with a bottom surface (e.g., surface 200 or 202).

In contrast to previously described slider embodiments, slider 196 includes a corner piece 212 formed within cavity 204 by surface 200 and elevational step 206. While corner piece 212 is depicted in one particular corner of cavity 204, it is within the scope of the present invention that corner pieces similar to corner piece 212 be formed in any or all of an illustrative four corners of the cavity. Such corner pieces could illustratively have different individual depth 152 values or similar individual depth 152 values. In accordance with an embodiment of the present invention, the quantity, positioning, depth and shape of the corner pieces are selected to produce slider performance characteristics that are desired for a particular disc head slider application. Illustratively, multiple corner pieces having different shapes and forming different bottom surfaces could be incorporated into a cavity 204.

In accordance with one embodiment, regardless of the quantity or positioning of corner pieces similar to corner piece 212, depth 152 progressively varies between a first point on a side 148 and a corresponding second point on an opposing side 148, the first and second points not necessarily being positioned in locations identical to the illustrated points 208/210. In accordance with another embodiment, at least two corner pieces similar to corner piece 212 are disposed within cavity 204, and each corner piece has a unique depth. Finally, while corner piece 212 is depicted in FIG. 10 with an elevational step 206 that protrudes out to an area near the center of cavity 204, it should be understood that step 206 could be otherwise configured so as to change the shape of corner piece 212.

FIGS. 11–14 are schematic top plan view representations of specialized sub-ambient pressure cavity configurations in accordance with further embodiments of the present invention. The same reference numbers are used in FIGS. 11–14 for elements that are the same or similar to those elements illustrated and labeled in previously described embodiments. It should be emphasized that FIGS. 11–14 are schematic in nature. For example, in each of these Figures, the cavity is depicted as having four sides 214 that provide an illustrative rectangular cavity shape. The depicted specialized cavity configurations, to be described below, however, could just as easily be applied within cavities having other shapes, such as within the octagonally shaped cavities depicted in relation to previously described embodiments. The shape changes required to accommodate different cavity shapes should be an assumed feature of the illustrated and described schematic designs.

FIG. 11 depicts a sub-ambient pressure cavity 216 having a longitudinal axis 158 and a transversal axis 176, a cavity leading end 218 (closer to the leading end of the slider) and a cavity trailing end 220 (closer to the trailing end of the slider). Cavity 216 includes a cavity floor 222 having four bottom surfaces, namely surfaces 224, 226, 228 and 230. Although not directly labeled in the Figure, it is assumed that cavity 216, and each of the four individual bottom surfaces, includes a depth 152 measured from a plane level with at least one bearing surface associated with cavity 216 to an illustratively flat top portion of each of bottom surfaces 224, 226, 228 and 230. In accordance with one embodiment, depth 152 of cavity 216 progressively varies between a first point on one of sides 214 to a corresponding second point on an opposing (e.g., directly across cavity 216) side 214.

Bottom surfaces 224 and 228 are substantially positioned on one side of longitudinal axis 158 and bottom surfaces 226 and 230 are substantially positioned on the other side of the axis. Similarly, bottom surfaces 224 and 226 are substantially positioned on one side of transversal axis 176 and bottom surfaces 228 and 230 are substantially positioned on the other side of the axis. Illustratively, some or none of the bottom surfaces may have matching shapes (and they need not necessarily be square) or have matching depths.

In accordance with one embodiment of the present invention, bottom surfaces 224 and 226 are positioned on one side of transversal axis 176 and bottom surfaces 228 and 230 are positioned on the other side of the axis. In addition, bottom surfaces 224 and 228 are positioned on one side of longitudinal axis 158 and bottom surfaces 226 and 230 are positioned on the other side of the axis. In a first version of this embodiment, each of the four bottom surfaces includes a unique depth 152 value. In accordance with another embodiment, no two bottom surfaces on either side of transversal axis 176 or longitudinal axis 158 have the same depth 152 value, but at least two of the four bottom surfaces have the same depth 152 value (i.e., surfaces 224 and 230 have a first depth 152 value and surfaces 226 and 228 have a second depth 152 value).

FIG. 12 depicts a sub-ambient pressure cavity 232 having a longitudinal axis 158 and a transversal axis 176, a cavity leading end 218 and a cavity trailing end 220. A cavity floor 234 includes four bottom surfaces, namely surfaces 236, 238, 240 and 242. Although not directly labeled in the Figure, it is assumed that cavity 232, and each of the four individual bottom surfaces, includes a depth 152 measured from a plane level with a bearing surface associated with cavity 232 to an illustratively flat top portion of each of bottom surfaces 236, 238, 240 and 242. In accordance with one embodiment, some or none of the bottom surfaces may have matching shapes (i.e., they need not necessarily be identically shaped rectangles) or matching depths. In accordance with one embodiment, elevational steps 244 are disposed between the steps and may be curved or irregular, rather than straight (e.g., a series of curved terraces) and can be contoured. Finally, while four bottom surfaces are depicted in FIG. 12, more or less could be actually incorporated without departing from the scope of the present invention.

Bottom surfaces 236, 238, 240 and 242 are longitudinally extending surfaces (extending along longitudinal axis 158) that are separated from one another by an elevational step 244. Illustratively, the depth of cavity 232 progressively varies between a first point 246 on one of sides 214 to a corresponding second point 248 on an opposing (i.e., directly across cavity 232) side 214. For example, bottom surface 242 has a shallower depth than bottom surface 236. This embodiment is clearly depicted in FIG. 12-1, which is a sectional view taken along line 12-1 in FIG. 12. In accordance with another embodiment, however, bottom surface 242 has a deeper depth than bottom surface 236. Illustratively, in both of these embodiments, the overall depth of cavity 232 progressively varies from a point on one of sides 214 to a corresponding second point on an opposing side 214 (i.e., progressively varies from point 246 to point 248).

FIG. 13 depicts a sub-ambient pressure cavity 250 having a longitudinal axis 158 and a transversal axis 176. A cavity floor 252 includes four bottom surfaces, namely surfaces 254, 256, 258 and 260. Although not directly labeled in the Figure, it is assumed that cavity 250, and each of the four individual bottom surfaces, includes a depth 152 measured from a plane level with a bearing surface associated with cavity 250 to an illustratively flat top portion of each of bottom surfaces 254, 256, 258 and 260. In accordance with one embodiment, some or none of the bottom surfaces may have matching shapes (i.e., they need not necessarily be identically shaped rectangles) or matching depths. In accordance with one embodiment, elevational steps 262 may be curved or irregular, rather than straight (i.e., a series of curved terraces). Finally, while four bottom surfaces are depicted in FIG. 13, more or less could be actually incorporated without departing from the scope of the present invention.

Bottom surfaces 254, 256, 258 and 260 are transversely extending surfaces (extending along transversal axis 176) that are separated from one another by an elevational step 262. Illustratively, the depth of cavity 250 progressively varies between a first point 264 on one of sides 214 to a corresponding second point 266 on an opposing (i.e., directly across cavity 250) side 214.

In accordance with one embodiment, bottom surface 254 has a shallower depth than bottom surface 260. In accordance with another embodiment, however, bottom surface 254 has a deeper depth than bottom surface 260. Illustratively, in both of these embodiments, the overall depth of cavity 250 progressively varies from a point on one of sides 214 to a corresponding second point on an opposing side 214 (i.e., progressively varies from point 264 to point 266).

FIG. 14 depicts a sub-ambient pressure cavity 268 having a longitudinal axis 158, an outside side 270 (closest to outside rail portion of a slider) and an inside side 272 (closest to inside rail portion of a slider). A cavity floor 274 includes a tapered bottom surface 276. Although not directly labeled in the Figure, it is assumed that cavity 268 includes a depth 152 measured from a plane level with a bearing surface associated with cavity 268 to tapered bottom surface 276. In accordance with one embodiment, the depth of cavity 268 is most shallow proximate outside side 270 and progressively gets deeper until reaching the deepest depth proximate inside side 272. The surface progressively changes from a first point 271 on a side 214 to a corresponding (i.e., located directly across cavity 268) point 273 on an opposing side 214. This embodiment is clearly depicted in FIG. 14-1, which is a sectional view taken along line 14-1 in FIG. 14. In accordance with one embodiment, tapered surface 276 is oppositely formed such that the deepest and shallowest depths of cavity 268 are switched.

Illustratively, tapered bottom surface 276 includes a line of maximum slope 278 that follows and points in the direction of the maximum slope of the tapered surface. Line 278 is illustratively offset from longitudinal axis 158 at an angle 280. In accordance with one embodiment, a stepped slope surface similar to those described in relation to FIGS. 12 and 13 could be substituted for tapered surface 276 and still have a maximum line of slope 278 that is offset from longitudinal axis 158. It should be noted that the deepest and shallowest portions of cavity 268 can be switched without departing from the scope of the present invention.

FIGS. 14 and 14-1 illustratively include line 278 that follows the slope of surface 276 and is offset from longitudinal axis 158 at an angle 280 of approximately 90 degrees (approximately perpendicularly situated). In accordance with another embodiment, tapered surface 276 is tapered such that line of maximum slope 278 is offset from longitudinal axis 158 at an angle 280 of approximately 45 degrees (i.e., tapered from corner to corner with either corner being having the deepest or shallowest depth). A stepped bottom surface could illustratively be substituted for tapered surface 276 without departing from the spirit of this embodiment of the present invention. Also, angles 280 other than 45 degrees and 90 degrees for maximum line of slope 278 should be considered within the scope of the present invention.

It should again be emphasized that, in accordance with an embodiment of the present invention, any of the disclosed bottom surface features can be formed within sub-ambient pressure cavities and can be selected based on a particular slider or slider application to produce various desired slider performance-related outcomes. Illustratively, particular bottom surface features can be selected to intentionally minimize manufacturing variation-induced undesirable losses in head media spacing, thereby reducing the likelihood of associated undesirable mechanical and electrical performance outcomes.

While all of the embodiments disclosed herein are within the scope of the present invention, there are at least two reasons why a cavity embodiment with a shallower portion proximate the leading edge of a slider and a deeper portion proximate the trailing edge of a slider might be particularly beneficial. First, this configuration produces a higher suction force at the trailing edge of the cavity, as compared to the suction force produced at the leading edge (therefore having the global suction center biased towards the trailing edge, or closer to the pole tip). Second, the configuration still utilizes the entire air bearing real estate to generate as much suction and lift force as possible given the limited about of slider surface area. To compensate for larger suction, larger lift could illustratively also be generated by designing the air bearing surface, for example, to include trenches that will produce more lift force per unit area than continuous open rails.

Accordingly, a tapered cavity (shallower portion proximate leading edge) illustratively yields a larger suction/lift and pitch stiffness, vertical stiffness, and contact stiffness than a similar single-depth cavity. For example, a tapered (or multi-level tapered) cavity (shallower portion proximate leading edge) will produce more than 70 mg/nm as compared to 57 mg/nm for the corresponding single level cavity. This result translates into lower manufacturing sensitivity for the tapered or multi-level cavity. Table 1 below illustrates fly attitude, suction force and stiffness levels for a single level cavity, as compared to a tapered and multi-level tapered cavity.

TABLE 1

|  | Single Level Cavity | Tapered Cavity | Multi-Level Cavity |
|---|---|---|---|
| PTFH (nm) | 10.25 | 10.09 | 10.23 |
| Pitch (urad) | 229 | 225 | 230 |
| Roll (urad) | −0.7 | 2.5 | 0.51 |
| Suction (gmf) | 2.78 | 4.0 | 3.90 |
| Kz (gmf/nm) | 0.09 | 0.168 | 0.164 |
| Kp (uN.M/urad) | 0.20 | 0.49 | 0.49 |
| Kc (mg/nm) | 57.6 | 70.9 | 70.2 |

The present invention also contemplates an approach to reducing potential contacts between a loading/unloading slider and a corresponding disc surface. The specialized cavity features of the present invention are illustratively capable of providing variable suction force during loading and unloading for sliders with different PSA and RSA. Illustratively, an opposite movement of suction center in a width direction (or length direction) can offset the negative pressure developed under different RSA or PSA conditions. Illustratively, this can provide enough torque to prevent or reduce slider contact.

While all of the embodiments disclosed herein are within the scope of the present invention, there is support for the notion that a cavity embodiment similar to the embodiment actually depicted in FIGS. 14 and 14-1 (with a deeper portion proximate the inside rail of a slider and a shallower portion proximate the outside rail of a slider) might be particularly beneficial. Illustratively, a cavity profiled in the depicted manner can effectively switch the center of suction force during loading under RSA conditions. The switch helps provide opposite torque to counteract the torque induced by RSA and thus enables an avoidance or reduction of slider/disc contact during loading. FIG. 25, which is described in greater detail below, is a graph that depicting a collection of illustrative depth measurements for a slider having a cavity that includes a configuration similar to FIGS. 14 and 14-1.

FIG. 15 is a graph illustrating a contact window for a regular air-bearing slider (i.e., single depth cavity). The graph plots PSA 178 versus RSA 180 (both in units of degrees). Within the graph, the dots represent no load contact for the specific PSA/RSA conditions. The "x" marks represent contact with the disc surface. FIG. 16 is a graph illustrating a contact window or a slider having a profiled cavity tapered from one rail side to the other, similar to the slider illustrated in FIGS. 14 and 14-1. The FIG. 16 graph plots the same units against each other and in a similar manner as the graph in FIG. 15. These two graphs (FIGS. 15 and 16) show that the profiled cavity design demonstrates an improved no contact window.

FIG. 17 is a graph illustrating "contact energy" for a regular air-bearing slider (i.e., single depth cavity). The graph plots the same units against each other as the graphs in FIGS. 15 and 16. Contact energy is illustratively a measurement of overall contact impact and is defined as contact force multiplied by time. A big dot on the FIG. 17 graph represents severe impact and a small dot represents less severe impact. FIG. 18 is a graph illustrating contact energy for a slider having a profiled cavity tapered from one rail side to the other, similar to the slider illustrated in FIGS. 14 and 14-1. The FIG. 18 graph plots the same units against each other and in a similar manner as the FIG. 17 graph. These two graphs (FIGS. 17 and 18) show that the profiled cavity design demonstrates impact reductions, as compared to a regular slider.

Table 1 (above) and FIGS. 15–18 demonstrate but a few examples of a wide range of potential benefits and outcomes obtainable by a few of the many embodiments of the present invention. It should again be emphasized that the most appropriate and effective embodiment of the present invention is application-dependent and dependent upon a broad range of potential performance characteristics. While the specific potential benefits of every embodiment are not presently discussed, the benefits can illustratively be inferred based on the specific potential benefits that are presently discussed.

In accordance with another embodiment of the present invention, another way to improve load/unload characteristics of an air-bearing slider is to pattern, texture, or otherwise shape the bottom surface of the cavity floor associated with that slider. When a slider is in motion (either across the disc or on/off the disc) the location of the center of suction with respect to the cavity is in motion. This motion of the center of suction couples with the inertia of the slider acting as a forcing function. Patterning, texturing or otherwise shaping the bottom surface of the cavity can illustratively dampen this forcing.

In the case of a slider having a smooth, flat cavity bottom surface, during load/unload processes, an air bearing slider oscillates in a manner that resembles a system of mass+spring+damper. The damping of the system may be increased by texturing or patterning the cavity at the approximate location of the center of suction. This illustratively produces noticeable improvement in the performance of load/unload functions.

FIGS. 19–21, in accordance with embodiments of the present invention, are schematic plan views of disc head sliders, as viewed from a disc surface. The same references numbers are used in FIGS. 19–21 for elements that are the same or similar to those elements illustrated and labeled in previously described embodiments.

FIG. 19 illustratively depicts a slider 282 that includes rail 140, rail 142 and cavity dam 144 with sub-ambient pressure cavity 284 positioned there between. In accordance with an embodiment of the present invention, a cross-like shape 286 is positioned on a bottom surface or cavity floor 288. Illustratively, cross-like shape 286 may be either shallower or deeper than surface 288. The pattern could illustratively be generally located at or near a center of suction associated with cavity 284, however, it should be noted that the location of center of suction generally varies during operation, depending on a wide range of factors. For an embodiment where shape 286 is deeper than surface 288, the shape may illustratively be generated using an additional pass through a photo/milling system. In accordance with one embodiment, shape 286 is only a few micron in width, therefore not affecting the steady state flight performance of slider 282 during operation of an associated disc drive. In accordance with one embodiment, the pattern is disposed upon a cavity floor having bottom surfaces consistent with any of the above-described specialized cavity configurations.

Illustratively, cross-like shape 286 improves load/unload performance characteristics of slider 282 by damping out the amplitude of the center of suction due to expansion and compression waves caused by the change in height field between the cavity and the pattern. FIG. 22 is a graph illustrating "contact energy" for a regular air-bearing slider (i.e., single depth cavity). The graph plots PSA 178 versus RSA 180. The nature of contact energy and the nature of the FIG. 22 graph is discussed above in relation to previously described embodiments (i.e., in relation to FIG. 6). A big dot on the FIG. 22 graph represents severe slider/media impact and a small dot represents less severe impact. FIG. 23 is a graph illustrating contact energy for a slider having a cross-like shape 286 disposed on a cavity bottom surface and having a shallower depth than the bottom surface. The FIG. 23 graph plots the same units against each other and in a similar manner as the FIG. 22 graph. FIG. 24 is a graph illustrating contact energy for a slider having a cross-like shape 286 disposed on a cavity bottom surface and having a deeper depth than the bottom surface. The FIG. 24 graph plots the same units against each other and in a similar manner as the FIG. 22 graph. The graphs in FIGS. 22, 23 and 24 show that sliders having a cavity with a cross-like shape 286 demonstrate better overall performance than a regular non-patterned slider.

While FIGS. 19, 23 and 24 are associated with cross-like shape 286, the optimal pattern or shape may differ significantly from that particular pattern. Other patterns or shapes should be considered within the scope of the present invention. In accordance with another embodiment of the present invention, FIG. 20 illustrates a slider 290 having a cavity 292 that is similar to cavity 284 of slider 282, but instead includes a square pattern 294 disposed on bottom surface or cavity floor 296. Again, pattern 294 could illustratively be deeper or shallower than bottom surface 296. In accordance with another embodiment, FIG. 21 illustrates a slider 298 having a cavity 300 that is similar to cavity 292 of slider 290 but instead includes a one-sided circle pattern 302 disposed on bottom surface or cavity floor 304. Again, pattern 302 could illustratively be deeper or shallower than bottom surface 304. Illustratively, the precise shape and location of a pattern or shape utilized in accordance with embodiments of the present invention is application dependent and dependent upon a broad range of potential performance characteristics that might be desirable depending on the particular circumstances. In accordance with one embodiment, the pattern or shapes could be positioned so as to affect suction force characteristics associated with the sub-ambient pressure cavity, as described above in relation to previously described embodiments.

For embodiments of the present invention wherein a pattern is disposed on a cavity floor or bottom surface and has a deeper depth than the depth of the bottom surface or cavity floor, the difference between the bottom surface depth and the pattern depth could illustratively be as small as 2 microns. The width of an incorporated patter could illustratively be anywhere between 2.5 microns and 25 microns in width, depending on the nature and design of the incorporated pattern.

For embodiments of the present invention wherein a pattern is disposed on a cavity floor or bottom surface and has a depth that is shallower than the depth of the bottom surface or cavity floor, the depth of the raised (column-like) pattern could illustratively extend to a depth anywhere between the surface upon which the pattern is disposed and a plane that extends even with an associated bearing surface. In accordance with other embodiments, the pattern extends no further than any air bearing rail or no more than 2 microns. In accordance with one embodiment, raised (column-like) patterns that extend far enough away from the cavity bottom surface (or cavity floor) that contact with a disc surface becomes a risk, a cap comprising a physically lubricating material can be applied to the top or disc-facing surface of the pattern. Illustratively, such a cap could be constructed of diamond-like carbon (DLC), however, other similar materials could just as easily perform the same function.

It should be noted that listed measurements are intended to be illustrative only and that patterns having measurements other than those specifically listed should still be considered within the scope of the present invention. Also, it should be noted that any of the above described patterns could illustratively be positioned on a cavity floor so as to be generally in the center of the cavity floor (similar to FIGS. 19 and 20), or generally proximate to a leading side (closest to leading end of slider), trailing side (closest to trailing end of slider), outside side (similar to FIG. 21 or closest to outside rail of slider) or inside side (closest to inside rail of slider) of the sub-ambient pressure cavity.

FIG. 25 is a graph that depicting a collection of illustrative depth measurements for a slider having a cavity that includes a configuration similar to FIGS. 14 and 14-1. The graph plots depth 306 and length 308 (both in units of μm). Length 308 illustratively follows a corresponding length of a slider body and a pair of slider rails illustratively correspond to the two locations in the graph where the depth is 0 μm. A slider cavity illustratively has depth values between the two 0-value rail depths. The cavity decreases across the length of the cavity from an approximate −1.8 μm proximate an outside rail side 312 of the graph to an approximate −3 μm proximate an inside rail side 310 of the graph. This configuration is but one example of a collection of depths for a slider having a cavity similar to that illustrated and described in relation to FIGS. 14 and 14-1.

In summary, one embodiment of the present invention pertains to a disc head slider (110, 160, 196) having a slider body (132) that includes a bearing surface (140, 142), a cavity dam (144) and a sub-ambient pressure cavity (146, 162, 204, 216, 232, 250), the sub-ambient pressure cavity (146, 162, 204, 216, 232, 250) having a cavity floor (135, 164, 198, 222, 234, 252), a plurality of sides (148, 214) and a depth (152) that progressively varies between a point (154, 172, 208, 246, 264) on one of the sides and a corresponding point (156, 174, 210, 248, 266) on an opposing side, and wherein the cavity floor (135, 164, 198, 222, 234, 252) comprises a plurality of substantially flat bottom surfaces (151, 153, 166, 168, 200, 202, 224, 226, 228, 230, 236, 238, 240, 242, 254, 256, 258, 260) separated by at least one elevational change (155, 170, 206, 244, 262).

Another embodiment pertains to a disc head slider (110, 160, 196) having a slider body (132) that includes a bearing surface (140, 142), a cavity dam (144) and a sub-ambient pressure cavity (146, 162, 204, 216, 232, 250), the sub-ambient pressure cavity (146, 162, 204, 216, 232, 250) having a cavity floor (135, 164, 198, 222, 234, 252) that includes at least three different depths (152), and wherein the cavity floor (135, 164, 198, 222, 234, 252) comprises a plurality of substantially flat bottom surfaces (151, 153, 166, 168, 200, 202, 224, 226, 228, 230, 236, 238, 240, 242, 254, 256, 258, 260) separated by at least one elevational change (155, 170, 206, 244, 262).

Another embodiment pertains to a disc head slider (110) having a slider body (132) that includes a bearing surface (140, 142), a cavity dam (144) and a sub-ambient pressure cavity (268). The sub-ambient pressure cavity (268) has a cavity floor (274), a longitudinal axis (158) and a plurality of sides (214). The sub-ambient pressure cavity (268) also has a depth (152) that progressively varies between a first point (271) on one of the sides (214) and a corresponding second point (273) on an opposing side (214). The cavity floor (274) has a tapered bottom surface (276) and a line of maximum slope (278) that is offset at an angle (280) from the longitudinal axis (158).

Another embodiment pertains to a disc head slider (282, 290, 298) that includes a slider body (132) having a bearing-surface (140, 142), a cavity dam (144) and a sub-ambient pressure cavity (284, 292, 300). The sub-ambient pressure cavity (284, 292, 300) has a plurality of sides (148), a cavity floor (288, 296, 304) and a first depth (152). A protruding pattern (286, 294, 302) is disposed on the cavity floor and is disassociated from the plurality of sides (148). The protruding pattern has a second depth (152) that is less than the first depth (152).

Another embodiment pertains to a disc head slider (282, 290, 298) having a slider body (132) that includes a bearing-surface (140, 142), a cavity dam (144) and a sub-ambient pressure cavity (284, 292, 300). The sub-ambient pressure cavity (284, 292, 300) has a plurality of sides (148), a cavity floor (288, 296, 304) and a first depth (152). A recessed pattern (286, 294, 302) is disposed on the cavity floor (288, 296, 304) and is disassociated from the plurality of sides (148). The recessed pattern (286, 294, 302) has a bottom surface and a second depth (152). The second depth (152) is greater than the first depth (152) and sufficient to affect a pressure characteristic associated with the sub-ambient pressure cavity (284, 292, 300) during operational motion of the disc head slider (282, 290, 298).

It is to be understood that even though numerous characteristics and advantages of various embodiments of the invention have been set forth in the foregoing description, together with details of the structure and function of various embodiments of the invention, this disclosure is illustratively only, and changes may be made in detail, especially in matters of structure and arrangement of parts within the principles of the present invention to the full extent indicated by the broad general meaning of the terms in which the appended claims are expressed. For example, the particular elements may vary depending on the particular application for the disc drive while maintaining substantially the same functionality without departing from the scope and spirit of the present invention. In addition, although the preferred embodiment described herein is directed to a disc head slider having a specialized cavity configuration, it will be appreciated by those skilled in the art that the teaching of the present invention can be applied to other types of sliders, such as a positive pressure slider having no cavity dam and sliders having different numbers of rails and rail shapes without departing from the scope and spirit of the present invention. Also, the present invention can be used with any type of ramp load-unload or contact start-stop suspension, such as rotary and linear suspensions, and the transducing head can be of any type such as magnetic, magneto-resistive, optical or magneto-optical, for example.

What is claimed is:

1. A slider comprising:
   a leading edge and a trailing edge;
   a cavity dam;
   first and second rails extending from the cavity dam toward the trailing edge;
   a trailing center pad proximate the trailing edge of the slider, and
   a cavity comprising a cavity floor having a first surface and a second surface, the first surface disposed from the cavity dam toward the trailing edge, at least partially between the first and second rails, and wherein the second surface is deeper than the first surface relative to the cavity dam, and is disposed to a greater extent on one side of a longitudinal axis of the cavity, and at least a portion of the second surface is disposed in a space between the trailing center pad and one of the first and second rails and in a space between the trailing center pad and the cavity dam along a direction that is parallel to the longitudinal axis.

2. The slider of claim 1, wherein the second surface is further disposed proximate the trailing edge of the slider.

3. The slider of claim 1, wherein the second surface is at least partially disposed adjacent the trailing center pad.

4. The slider of claim 3, wherein the second surface is at least partially disposed adjacent the trailing center pad on a first side of the trailing center pad, and the first surface is at least partially disposed adjacent the trailing center pad on a second, opposite side of the trailing center pad such that the cavity has different depths on the first and second sides of the trailing center pad.

5. The slider of claim 3 wherein a majority of the cavity floor between a closest point on the first rail to the trailing center pad and a closest point on the trailing center pad to the first rail is occupied by the first surface, and a majority of the cavity floor between a closest point on the second rail to the trailing center pad and a closest point on the trailing center pad to the second rail is occupied by the deeper, second surface.

6. The slider of claim 1, wherein the first surface extends from the cavity dam to the trailing edge.

7. The slider of claim 1, wherein the first surface of the cavity floor is at least partially disposed adjacent the cavity dam, and the second surface of the cavity floor is disposed between a portion of the first surface and the trailing edge of the slider.

8. The slider of claim 1, wherein one of the first surface and the second surface occupies a majority of the cavity floor, and the other of the first surface and the second surface occupies a minority of the cavity floor.

9. A slider comprising:
   a leading edge and a trailing edge;
   a cavity dam;
   a trailing pad positioned generally along the trailing edge; and
   a cavity comprising a cavity floor, which extends from the cavity dam toward the trailing edge of the slider and has a longitudinal axis, wherein the trailing pad is positioned generally along the longitudinal axis and wherein the cavity floor has a first depth adjacent the trailing pad on a first side of the longitudinal axis and a second, different depth adjacent the trailing pad at a corresponding opposing location on a second, opposite side of the longitudinal axis.

10. The slider of claim 9, wherein the cavity floor comprises a first surface at the first depth and a second surface at the second depth, which extend at least partially proximate the trailing edge on the first and second sides, respectively, of the longitudinal axis.

11. The slider of claim 9, wherein the second depth is greater than the first depth, and the deepest portion of the cavity floor on the first side of the longitudinal axis is at the first depth.

12. The slider of claim 9, wherein the cavity floor comprises a first surface at the first depth and a second surface at the second depth, wherein the second depth is greater than the first depth, wherein the second surface is disposed entirely on the second side of the longitudinal axis.

13. The slider of claim 9 and further comprising first and second side rails disposed about a portion of the cavity floor and extending from the cavity dam toward the trailing edge.

14. The slider of claim 13, wherein a majority of the cavity floor between a closest point on the first rail to the trailing pad and a closest point on the trailing pad to the first rail is at the first depth, and a majority of the cavity floor between a closest point on the second rail to the trailing pad and a closest point on the trailing pad to the second rail is at the second depth.

15. The slider of claim 9, wherein the cavity floor comprises a first surface at the first depth and a second surface at the second depth and wherein the first surface extends from the cavity dam to the trailing edge.

16. A slider comprising:
a leading edge and a trailing edge;
a cavity dam;
first and second rails extending from the cavity dam toward the trailing edge;
a trailing center pad positioned along the trailing edge, and
a cavity comprising a cavity floor having a first surface and a second surface, the first surface disposed from the cavity dam toward the trailing edge, at least partially between the first and second rails, wherein the second surface is deeper than the first surface relative to the cavity dam, and is disposed to a greater extent on one side of a longitudinal axis of the cavity, and wherein a majority of the cavity floor between a closest point on the first rail to the trailing center pad and a closest point on the trailing center pad to the first rail is occupied by the first surface, and a majority of the cavity floor between a closest point on the second rail to the trailing center pad and a closest point on the trailing center pad to the second rail is occupied by the deeper, second surface.

17. A slider comprising:
a leading edge and a trailing edge;
a cavity dam;
a trailing pad positioned generally along the trailing edge; and
a cavity comprising a cavity floor, which extends from the cavity dam toward the trailing edge of the slider and has a longitudinal axis, wherein the trailing pad is positioned generally along the longitudinal axis, wherein the cavity floor has a first depth adjacent the trailing pad on a first side of the longitudinal axis and a second depth adjacent the trailing pad on a second, opposite side of the longitudinal axis, and wherein the second depth is greater than the first depth, and the deepest portion of the cavity floor on the first side of the longitudinal axis is at the first depth.

* * * * *